United States Patent
Ruan

(10) Patent No.: US 8,047,661 B2
(45) Date of Patent: Nov. 1, 2011

(54) HEIGHT ADJUSTMENT APPARATUS FOR PROJECTOR

(75) Inventor: Zhuo-Guang Ruan, Guangdong (CN)

(73) Assignees: Premier Image Technology(China) Ltd., Foshan, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 483 days.

(21) Appl. No.: 12/344,262

(22) Filed: Dec. 25, 2008

(65) Prior Publication Data

US 2010/0066924 A1 Mar. 18, 2010

(30) Foreign Application Priority Data

Sep. 12, 2008 (CN) .......................... 2008 1 0304479

(51) Int. Cl.
*G03B 21/22* (2006.01)
*G03B 21/14* (2006.01)

(52) U.S. Cl. ...................... 353/119; 248/188.2; 353/120

(58) Field of Classification Search .................. 348/836; 248/188.2, 188.3; 353/119, 122, 69, 70
See application file for complete search history.

(56) References Cited

U.S. PATENT DOCUMENTS

| | | | | |
|---|---|---|---|---|
| 6,719,431 B2* | 4/2004 | Liu et al. | .......................... | 353/70 |
| 6,793,348 B2* | 9/2004 | Lee et al. | ...................... | 353/119 |
| 6,796,538 B2* | 9/2004 | Hsu et al. | ................... | 248/188.2 |
| 6,923,417 B2* | 8/2005 | Chang | .......................... | 248/649 |
| 7,104,511 B2* | 9/2006 | Smith et al. | ................. | 248/188.2 |
| 7,111,948 B2* | 9/2006 | Lee et al. | ...................... | 353/119 |
| 7,156,526 B2* | 1/2007 | Tanaka | .......................... | 353/119 |
| 7,396,137 B2* | 7/2008 | Lim | .......................... | 353/119 |
| 7,409,271 B2* | 8/2008 | Lee et al. | .......................... | 701/1 |
| 2002/0113951 A1* | 8/2002 | Huang et al. | .................. | 353/119 |
| 2003/0227601 A1* | 12/2003 | Chang | .......................... | 353/119 |
| 2007/0273840 A1* | 11/2007 | Hamada | .......................... | 353/70 |

* cited by examiner

*Primary Examiner* — Brian Glessner
*Assistant Examiner* — Beth Stephan
(74) *Attorney, Agent, or Firm* — Altis Law Group, Inc.

(57) ABSTRACT

A height adjustment apparatus for a projector includes a lifting member and an operation member. The projector includes a front wall and a bottom wall substantially perpendicular to the front wall. The front wall defines a first opening and the bottom wall defines a second opening. The bottom wall has a protruding portion extending from an inner surface of the bottom wall. The lifting member includes a supporting portion and an engaging portion. An end surface of the lifting member away from the supporting portion has a plurality of teeth. The operation member includes a receiving frame and an operating portion. The inner surface of the receiving frame away from the operating portion has a latching portion for latching with the teeth of the lifting member.

17 Claims, 5 Drawing Sheets

HEIGHT ADJUSTMENT APPARATUS FOR PROJECTOR

TECHNICAL FIELD

The present disclosure relates to projectors and, particularly, to a height adjustment apparatus used in a projector.

DESCRIPTION OF THE RELATED ART

In general, projectors may require height adjustment for proper display. One form of adjustment in use is a hanging fixture suspending the projector from the ceiling. This fixture is inconvenient for height adjustment. In another common solution, projectors are placed on a table and are accordingly height-adjusted by way of one or more threaded posts adjustably extending downward from the underside of the projector. This is also an inconvenient operation and cannot adjust the height of the projector quickly.

What is needed, therefore, it is a height adjustment apparatus for a projector which can provide a convenient way of adjusting the height of a projector or other applicable devices.

BRIEF DESCRIPTION OF THE DRAWINGS

Many aspects of the present height adjustment apparatus for a projector can be better understood with reference to the accompanying drawings. The components in the drawing are not necessarily drawn to scale, the emphasis instead being placed upon clearly illustrating the principles of the present height adjustment apparatus for a projector.

DETAILED DESCRIPTION OF THE EMBODIMENTS

Embodiments of the present disclosure will now be described in detail below, with reference to the accompanying drawings.

Figure 1:
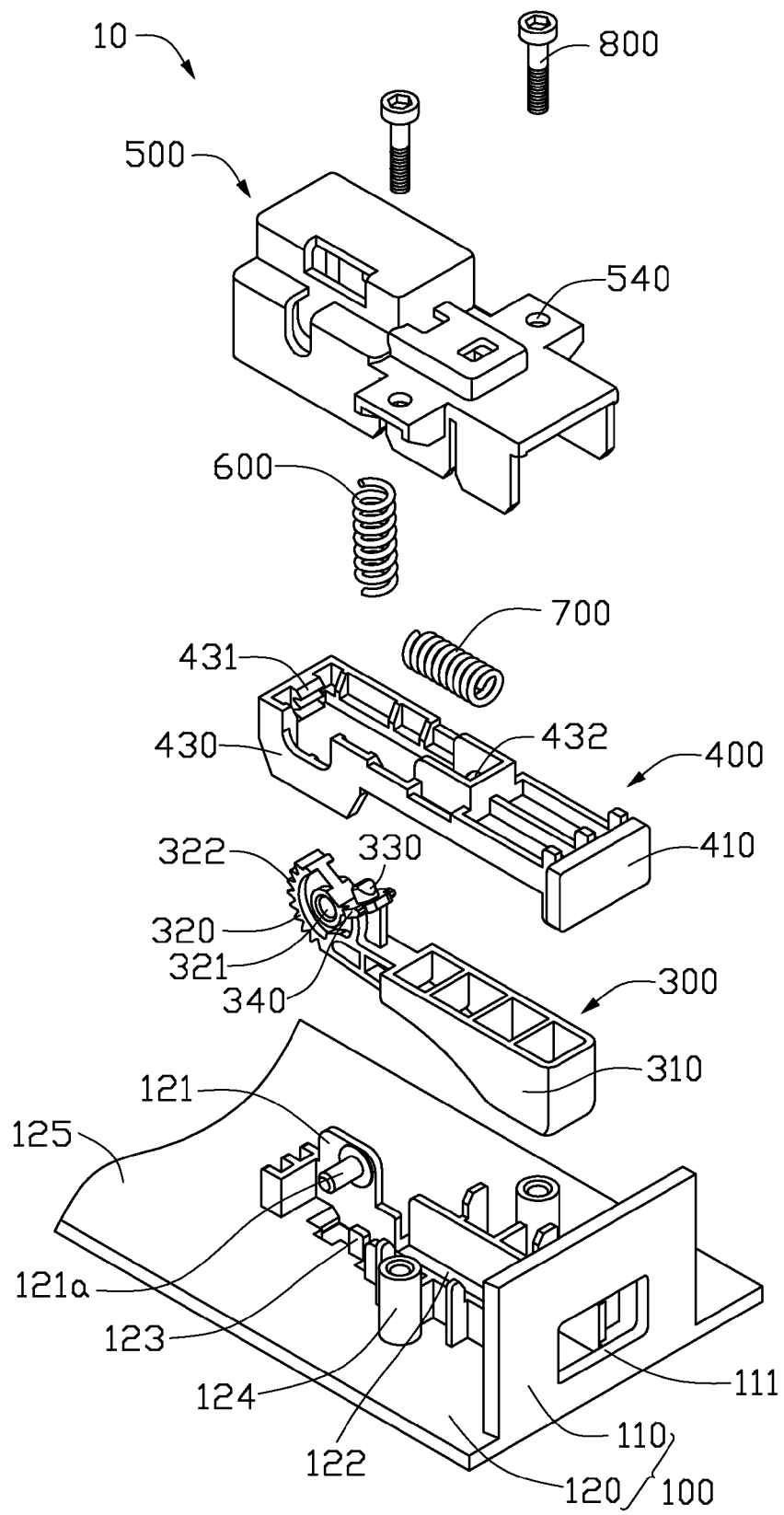
FIG. 1 is an exploded, isometric view of a height adjustment apparatus for a projector according to an exemplary embodiment.
Figure 2:
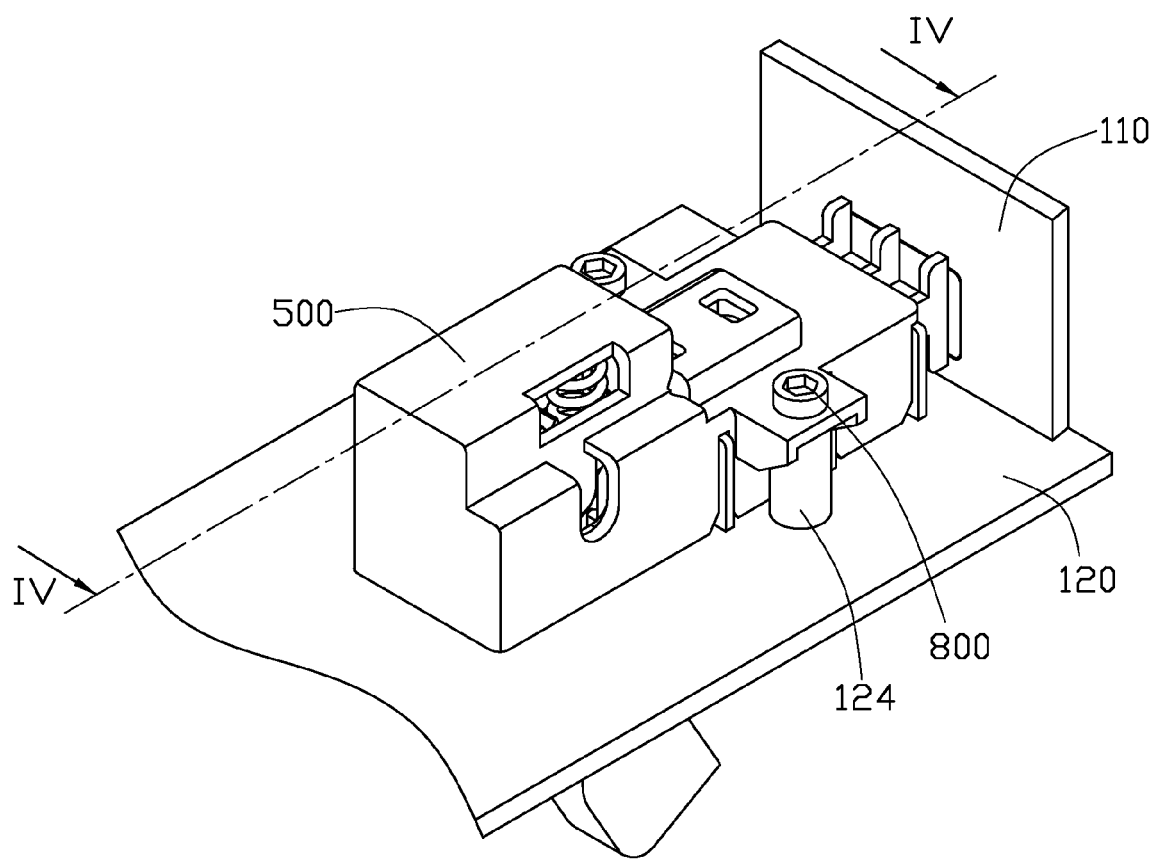
FIG. 2 is an assembled, isometric view of the height adjustment apparatus of FIG. 1.
Figure 3:
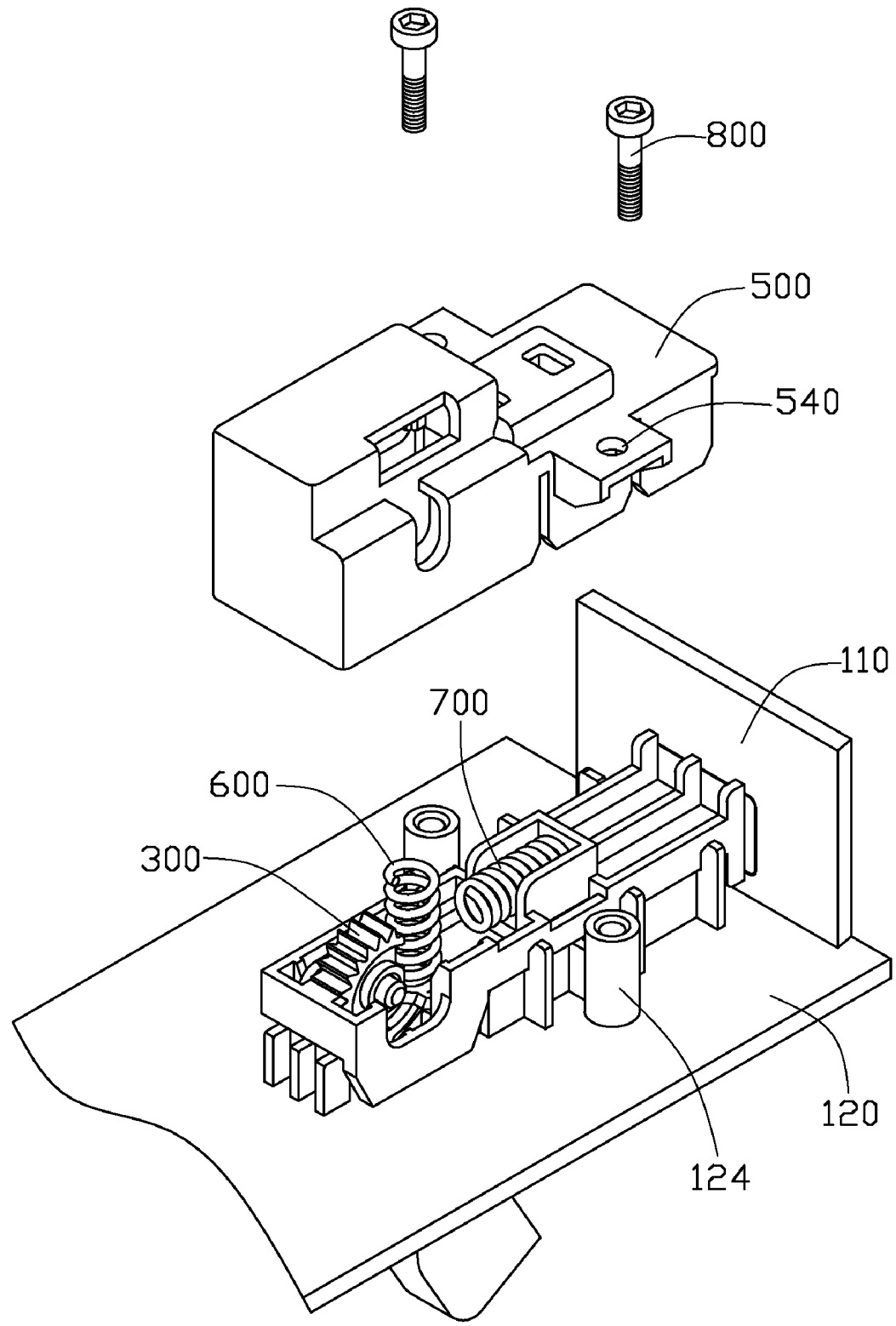
FIG. 3 is a partially exploded, isometric view of the height adjustment apparatus of FIG. 1.

Referring to FIGS. 1-3, a height adjustment apparatus 10 for a projector 100, according to an exemplary embodiment, is shown. The projector 100 includes a front wall 110 and a bottom wall 120 substantially perpendicular to the front wall 110. The front wall 110 defines a first opening 111 formed on a bottom portion near to the bottom wall 120. The bottom wall 120 defines a second opening 122 and includes a protruding portion 121 extending from an inner surface 125 of the bottom wall 120. The protruding portion 121 has a rotating shaft 121a disposed thereon. The rotating shaft 121a is substantially parallel to the front wall 110 and the bottom wall 120.

The height adjustment apparatus 10 includes a lifting member 300, an operation member 400, and a housing 500.

The lifting member 300 includes a supporting portion 310 and an engaging portion 320. The supporting portion 310 and the engaging portion 320 are located at two ends of the lifting member 300 respectively. The engaging portion 320 is pivotably connected to the protruding portion 121 of the bottom wall 120. In the present embodiment, a through hole 321 is defined in the engaging portion 320 for engaging with the shaft 121a. The engaging portion 320 has a toothed end surface 322 formed away from the supporting portion 310. The teeth formed on the toothed end surface 322 extend along a direction substantially parallel to the shaft 121a. The supporting portion 310 is at least partially received in the second opening 122 of the bottom wall 120, and can be rotated out of the second opening 122 to support the projector 100. The height of the projector 100 can be adjustable by changing the rotating range of the lifting member 300.

The operation member 400 includes a receiving frame 430 and an operating portion 410. The receiving frame 430 is capable of receiving the engaging portion 320 of the lifting member 300 and the protruding portion 121 of the bottom wall 120. The operating portion 410 is secured to an end of the receiving frame 430 and faces the front wall 110 of the projector 100, and is exposed from the first opening 111. The inner surface of the receiving frame 430 has a number of teeth 431 formed away from the operating portion 410 for latching with the toothed end surface 322 of the lifting member 300. When the teeth 431 are latched with the toothed end surface 322, the lifting member 300 is prevented from rotating. The operation member 400 can slide along a direction substantially perpendicular to the front wall 110 of the projector 100 by pressing the operating portion 410 of the operation member 400. When the operation member 400 slides away from the front wall 110 by pressing the operating portion 410, the teeth 431 separate from the toothed end surface 322 of the lifting member 300, thereby the lifting member 300 can be rotated.

The housing 500 is secured on the inner surface 125 of the bottom wall 120 for housing the lifting member 300 and the operation member 400. In the present embodiment, the inner surface 125 of the bottom wall 120 has two screw-receiving portions 124, and the housing 500 defines two through holes 540 to engage with the corresponding screw-receiving portions 124 of the bottom wall 120. Two screws 800 are inserted into the two screw-receiving portions 124 through the two through holes 540 to secure the housing 500 to the inner surface 125 of the bottom wall 120.

Figure 4:
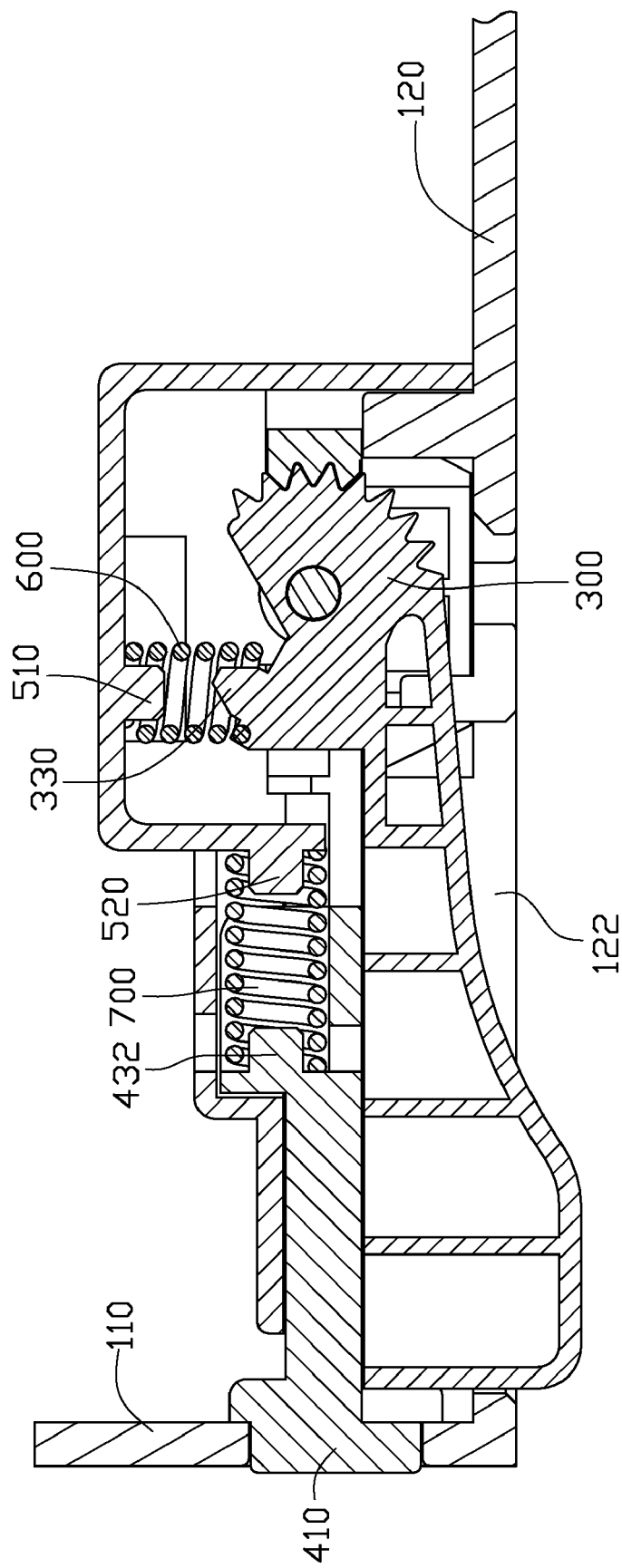
FIG. 4 is a cross-sectional view of the height adjustment apparatus taken along the line IV-IV of FIG. 2.

Referring to FIGS. 1 and 4, in order that the lifting member 300 can be automatically rotated out of the second opening 122, a first elastic member 600 is used for rotating the lifting member 300. In the present embodiment, the lifting member 300 further includes a first positioning post 330 disposed between the supporting portion 310 and the engaging portion 320, and a corresponding second positioning post 510 is formed on the inner surface of the housing 500. The first elastic member 600 is a spring with one end sleeving the first positioning post 330 of the lifting member 300 and the other end sleeving the second positioning post 510 of the housing 500.

In order that the operation member 400 can rebound towards the first opening 111 when the operating portion 410 is released, a second elastic member 700 is disposed between the operation member 400 and the housing 500. In the present embodiment, the inner surface of the receiving frame 430 adjacent to the operating portion 410 has a third positioning post 432, and a corresponding fourth positioning post 520 is formed on the outer surface of the housing 500. The second elastic member 700 is a spring with one end sleeving the third positioning post 432 of the operation member 400 and the other end sleeving the fourth positioning post 520 of the housing 500.

Figure 5:
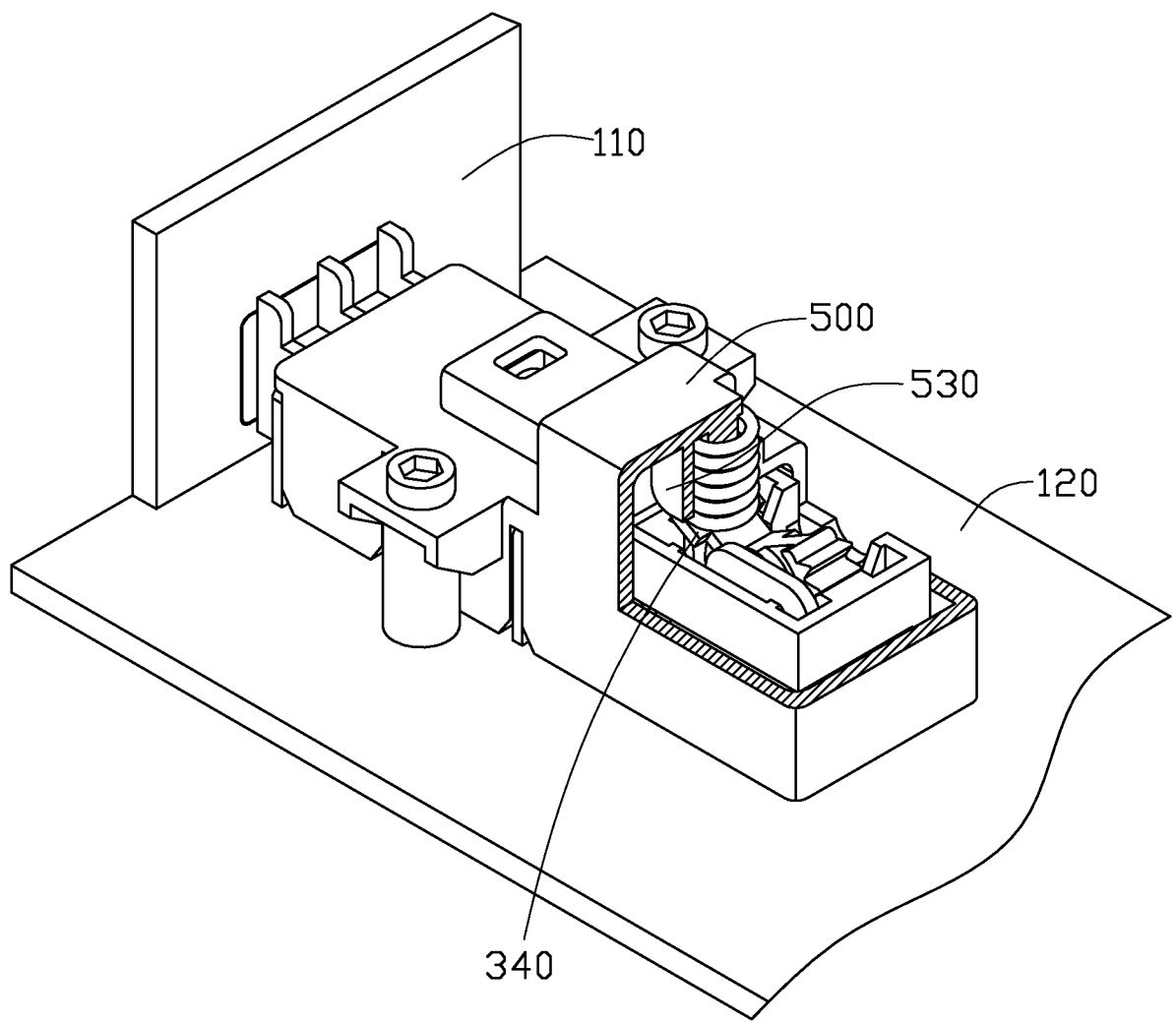
FIG. 5 is a cut-away view of the height adjustment apparatus of FIG. 1.

Referring to FIGS. 1 and 5, a convex stage 340 is formed on the circumference of the first positioning post 330. A first block 123 is formed on the inner surface 125 of the bottom wall 120, and a second block 530 is formed on the inner surface of the housing 500. The convex stage 340, the first block 123, and the second block 530 cooperatively limit the rotating angle of the lifting member 300.

When the height adjustment apparatus 10 is assembled, the lifting member 300 is firstly assembled on the protruding portion 121, then the operation member 400, the lifting member 300, and the bottom wall 120 are installed via the receiving frame 430 receiving the engaging portion 320 of the lifting member 300 and the protruding portion 121 of the bottom wall 120. Then one end of the first elastic member 600 is positioned to the first positioning post 330 of the lifting member 300 and one end of the second elastic member 700 is positioned to the third positioning post 432 of the operation member 400, furthermore, the housing 500 is assembled on the bottom wall 120 via positioning the other end of the first elastic member 600 to the second positioning post 510 and the other end of the second elastic member 700 to the fourth positioning post 520, at last, the screws 800 are inserted into the two screw-receiving portions 124 through the two through holes 540 to secure the housing 500 to the inner surface 125 of the bottom wall 120, thus the assembly of the height adjustment apparatus 10 is obtained.

To adjust the height of the projector 100, the operating portion 410 of the operation member 400 is pressed to separate the teeth 431 of the operation member 400 from the teeth of the toothed end surface 322 of the lifting member 300, then the supporting portion 310 of the lifting member 300 can be rotated out of the second opening 122 of the bottom wall 120 by the elastic force of the first elastic member 600 or rotated into the projector 100 by an external force. After the projector 100 is adjusted to a proper height, the operating portion 410 is released and the operation member 400 moves towards the first opening 111 by the elastic force of the second elastic member 700, at which time, the teeth 431 latch with the teeth of the toothed end surface 322 of the lifting member 300 to prevent the lifting member 300 from rotating.

While certain embodiments have been described and exemplified above, various other embodiments will be apparent to those skilled in the art from the foregoing disclosure. The present disclosure is not limited to the particular embodiments described and exemplified, and the embodiments are capable of considerable variation and modification without departure from the scope of the appended claims.

What is claimed is:

1. A height adjustment apparatus for a projector, the projector comprising a front wall and a bottom wall substantially perpendicular to the front wall, the front wall defining a first opening, and the bottom wall defining a second opening and a protruding portion extending from an inner surface of the bottom wall, the height adjustment apparatus comprising:

a lifting member comprising a supporting portion and an engaging portion located at two ends of the lifting member respectively, the engaging portion for being pivotably connected to the protruding portion, the supporting portion for being rotated out of the second opening, the engaging portion having a toothed end surface, the toothed end surface comprising a plurality of teeth; and an operation member comprising a receiving frame and an operating portion, the receiving frame for receiving the engaging portion and the protruding portion therein, the operating portion being secured to an end of the receiving frame for facing the front wall and being movably received in the first opening, the receiving frame having a latching portion, the latching portion extending from an inner surface of the receiving frame and facing to the operating portion, the latching portion latching with the teeth of the lifting member.

2. The height adjustment apparatus as claimed in claim 1, wherein the latching portion on the inner surface of the receiving frame is a plurality of teeth.

3. The height adjustment apparatus as claimed in claim 1, wherein the protruding portion comprising a rotating shaft substantially parallel to the front wall and the bottom wall, and the engaging portion of the lifting member defines a through hole for engaging with the shaft.

4. The height adjustment apparatus as claimed in claim 3, wherein each of the teeth of the toothed end surface of the lifting member extends along a direction substantially parallel to the shaft.

5. The height adjustment apparatus as claimed in claim 1, further comprising a housing for housing the lifting member and the operation member, and a first elastic member with one end thereof resisting the lifting member and the other end thereof resisting the housing such that the lifting member is capable of being pushed out of the second opening by the first elastic member.

6. The height adjustment apparatus as claimed in claim 5, wherein the lifting member comprises a first positioning post disposed between the supporting portion and the engaging portion, and the housing comprises a corresponding second positioning post on an inner surface thereof, the first elastic member is a spring with one end sleeves the first positioning post and the other end sleeves the second positioning post.

7. The height adjustment apparatus as claimed in claim 5, further comprising a second elastic member with one end thereof resisting an inner surface of the receiving frame adjacent to the operating portion and the other end thereof resisting the housing.

8. The height adjustment apparatus as claimed in claim 7, wherein the operation member comprises a third positioning post on the inner surface of the receiving frame adjacent to the operating portion, and the housing comprises a corresponding fourth positioning post, the second elastic member is a spring with one end sleeves the third positioning post and the other end sleeves the fourth positioning post.

9. The height adjustment apparatus as claimed in claim 5, wherein the lifting member further comprises a position limiting portion disposed between the engaging portion and the supporting portion, the inner surface of the bottom wall has a first block formed thereon, and the inner surface of the housing has a second block formed thereon, the position limiting portion, the first block, and the second block are configured to cooperatively limit the rotating range of the lifting member.

10. A projector comprising:

a front wall defining a first opening;

a bottom wall substantially perpendicular to the front wall, the bottom wall defining a second opening and a protruding portion extending from an inner surface of the bottom wall; and a height adjustment apparatus comprising:

a lifting member comprising a supporting portion and an engaging portion located at two ends of the lifting member respectively, the engaging portion being pivotably connected to the protruding portion, the supporting portion being capable of being rotated out of the second opening, the engaging portion having a toothed end surface, the toothed end surface comprising a plurality of teeth; and an operation member comprising a receiving frame and an operating portion, the receiving frame receiving the engaging portion and the protruding portion, the operating portion being secured to an end of the receiving frame facing the front wall and being movably received in the first opening, the receiving frame having a latching portion, the latching portion extending from an inner surface of the receiving frame and facing to the operating portion, the latching portion latching with the teeth of the lifting member.

11. The projector as claimed in claim 10, wherein the latching portion on the inner surface of the receiving frame is a plurality of teeth.

12. The projector as claimed in claim 10, wherein the protruding portion comprising a rotating shaft substantially parallel to the front wall and the bottom wall, and the engaging portion of the lifting member defines a through hole engaging with the shaft.

13. The projector as claimed in claim 12, wherein each of the teeth of the toothed end surface of the lifting member extends along a direction substantially parallel to the shaft.

14. The projector as claimed in claim 10, further comprising a housing for housing the lifting member and the operation member, and a first elastic member with one end thereof resisting the lifting member and the other end thereof resisting the housing such that the lifting member is capable of being pushed out of the second opening by the first elastic member.

15. The projector as claimed in claim 14, wherein the lifting member comprises a first positioning post disposed between the supporting portion and the engaging portion, and the housing comprises a corresponding second positioning post on an inner surface thereof, the first elastic member is a spring with one end sleeves the first positioning post and the other end sleeves the second positioning post.

16. The projector as claimed in claim 14, further comprising a second elastic member with one end thereof resisting an inner surface of the receiving frame adjacent to the operating portion and the other end thereof resisting the housing.

17. The projector as claimed in claim 16, wherein the operation member comprises a third positioning post on the inner surface of the receiving frame adjacent to the operating portion, and the housing comprises a corresponding fourth positioning post, the second elastic member is a spring with one end sleeves the third positioning post and the other end sleeves the fourth positioning post.

\* \* \* \* \*